Aug. 14, 1928.
A. GOTTSCHALK
AUTOMATIC DRAIN VALVE
Filed Aug. 10, 1923
1,680,288
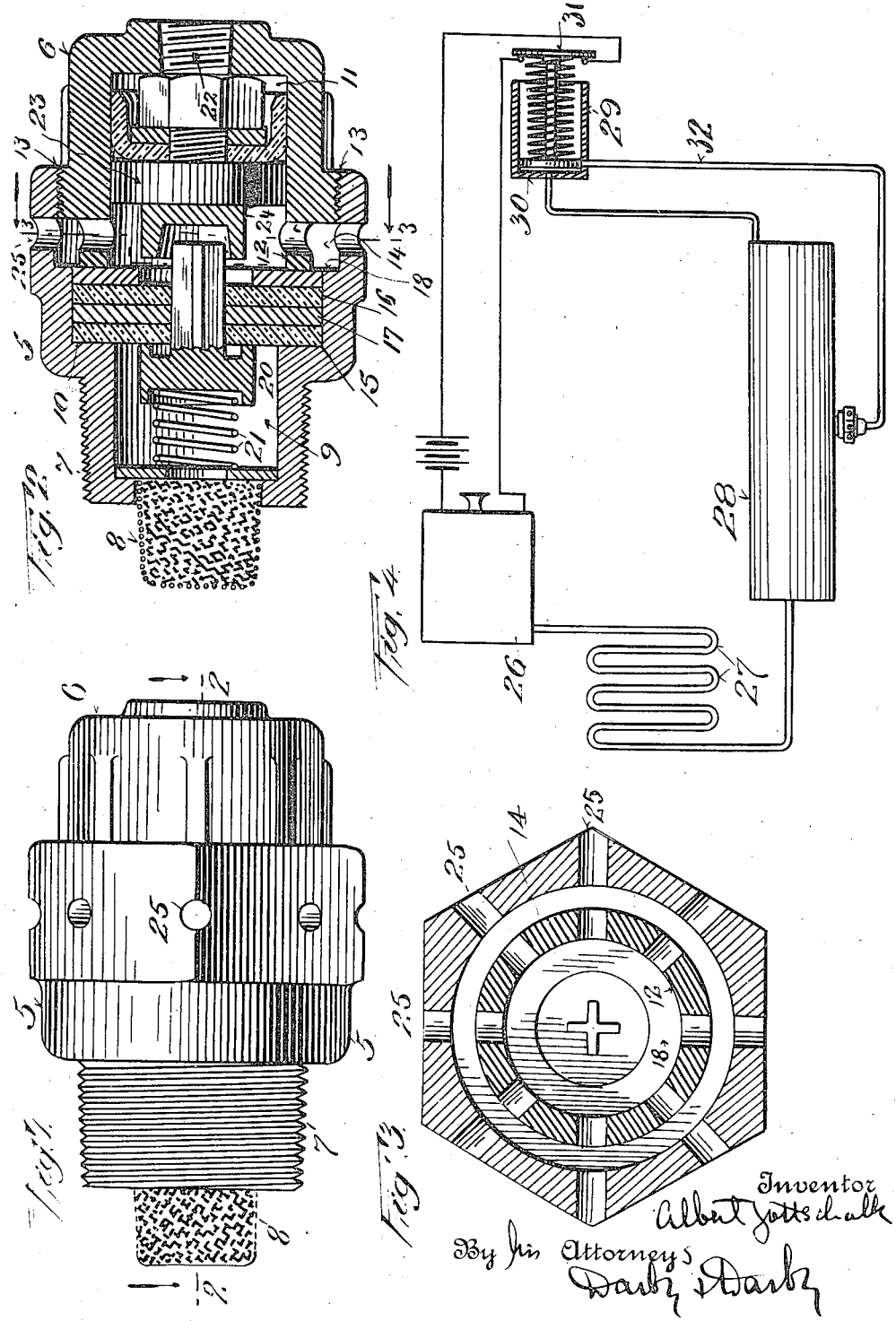

Patented Aug. 14, 1928.

1,680,288

UNITED STATES PATENT OFFICE.

ALBERT GOTTSCHALK, OF NEW YORK, N. Y.

AUTOMATIC DRAIN VALVE.

Application filed August 10, 1923. Serial No. 656,747.

This invention relates to drain valves and particularly drain valves designed for use in connection with compressed air reservoirs, tanks, pipes or the like, for eliminating accumulations of condensed water therefrom.

The object of the invention is to provide a drain valve for the purpose specified which is simple in structure, economical to manufacture and maintain, and easy to apply, and which operates automatically without care or attention.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing,

Fig. 1 is a view in side elevation of a drain valve structure embodying my invention.

Fig. 2 is a view in longitudinal central section of the same on the line 2, 2, Fig. 1.

Fig. 3 is a view in transverse section on the line 3, 3, Fig. 2.

Fig. 4 is a view in diagram showing a compressed air system including compressor, and reservoirs, with an automatic controller for the compressor, and showing the application of a drain valve embodying my invention to the reservoir, or one of them.

The same part is designated by the same reference numeral, and the various sectional views are taken on lines looking in the direction of the arrows indicated.

In the operation of street car or train brake and other systems and particularly where reservoirs, storage tanks, pipes or the like are employed, difficulties of various kinds are experienced by reason of the accumulation of water of condensation in the reservoir, tank, pipe or the like. The amount of condensation and the rate of its accumulation depends upon various factors. Ordinarily atmospheric air is compressed by compressors into the reservoir, and when I mention a reservoir in this connection I wish it to be understood that I mean to include storage tanks, pipes or the like in which the compressed air is stored or carried. The atmospheric temperature and humidity are factors which enter into the production of condensation in such systems, and these factors vary not only from time to time, but also according to whether the compression and storage of the compressed air takes place in the open air or in tunnels. It is common practice to regard condensation as commencing in the compressed air at the instant it leaves the compressor since atmospheric air contains more or less latent heat, and this heat is increased by the compression action. As the compressed air leaves the compressor it begins to expand and this expansion, together with the radiation which also takes place, results in absorbing or eliminating the heat, thereby inaugurating the condensing action. This condensation continues throughout the system, but occurs principally in the reservoir. Wherever it occurs the result is the collection of water in the bottom of the reservoir or storage place. The collection of this water of condensation is highly objectionable for the reasons, among others, that it is taken up and carried along with the supply of compressed air from the reservoir to the apparatus to which the compressed air is to be supplied, where it has the tendency to cut away the lubrication employed in such apparatus. Again, such accumulation of water in cold weather tends to freeze up and this causes obstruction in the system, and at all times it reduces the available air storage capacity of the reservoir. It is the usual practice, particularly in street railway, subway and elevated car systems to employ manually operated drain devices. This is objectionable for the reason that such devices require daily or periodic attention and this duty is frequently overlooped or forgotten, and in some cases the opening of the drain, particularly in the winter time, results in escape of the compressed air the release and expansion of which causes freezing thereby choking up the drain and preventing a complete elimination of the accumulated water. Moreover, the drains, particularly in the case of street railway and other cars are usually located beneath the car making it inconvenient and often difficult of access. In the case of the elevated car systems it is customary to employ buckets or pails in which to catch the water drained off from the reservoirs in order to prevent the same from dripping down on pedestrians or others in the street beneath.

For the foregoing and other practical reasons, it is exceedingly desirable to provide a drain which is automatic in action and therefore requires no daily or other periodic attention, and which prevents the accumulation of water in the reservoir.

It is among the special purposes of my present invention to provide an automatic drain device of this nature and in the accompanying drawing I have shown a structure of drain which is exceedingly simple and inexpensive to manufacture, and which, when once applied for use, requires no special care or attention.

A drain device embodying my invention consists of a casing composed of two hollow members 5, 6, which are threaded the one into the other. The member 5 is in the form of a plug having a threaded end 7, adapted to be screwed into the reservoir to which the device is to be applied. Preferably a strainer or screen 8 is applied over the opening in the threaded end 7.

The plug member 5 is formed with an interior chamber 9, having a shoulder 10, at the end thereof. The casing member 6 is formed with an interior cylindrical chamber 11, and with a rim 12 which extends into the plug 5 beyond the point of threaded connection of the two members 5, 6, as indicated at 13, thereby forming an annular chamber 14, between said rim 12, and the encompassing petty coat portion of the plug or member 5. Interposed between the shoulder 10, and the edge of rim 12 and clamped therebetween are disk members 15, 16, of leather or other suitable material to constitute valve seats, said disks being preferably separated from each other by a separating ring 17. Preferably a retaining ring 18 is interposed between the edge of rim 12 and the valve seat disk 16. Extending through central openings in the valve seat disks 15, 16, and separator and retaining rings 17, 18, is the wing stem 19 of a valve 20, which is disposed in chamber 9 to seat against the valve seat disk 15. If desired a light spring 21, may be employed to normally maintain the valve 20 seated, although the air pressure in the reservoir to which the device is to be applied will serve this purpose. The outer end of the casing member 6 is adapted, as indicated at 22 to receive a control pipe connection. Within the cylindrical chamber 11 of member 6 is a piston 23, carrying a valve 24 at its inner face adapted and arranged to seat against the valve seat disk 16. In normal position of the parts when not in operation the valve 20 is seated by the spring 21 while the valve 24 is retracted from its seat by fluid pressure on the piston 23 and said valve is so disposed with reference to the stem 19 of valve 20, as to engage said stem and unseat said valve 20 before the valve 24 is seated, and to maintain this relation as long as valve 24 remains seated. Likewise, when the reverse operation takes place, that is, when valve 24 is unseated, the unseating of said valve takes place before the valve 20 is seated. It is during these short intervals of time when both valves are in unseated position that ejection of any accumulation of condensation water from the reservoir takes place. To permit such ejection to take place the rim 12 of casing member 6, and the encompassing petty coat portion of the member 5 have port openings 25.

Pressure supply to the cylinder connection 22 to operate the piston 23 may be obtained from any desired source and controlled in any desired way. This, may be accomplished automatically by or according to the starting and stopping of the compressor, or by the operation of any mechanism upon which the operation of the compressor depends, or upon the operation of any mechanism which is actuated by the pressure medium supplied from the reservoir. In the diagrammatic illustration of Fig. 4, I have indicated a compressor 26, which supplies compressed air through a pipe system 27, to a reservoir 28, from which the compressed air is supplied to a cylinder 29 within which operates a piston 30 for opening and closing a switch 31, which controls the circuit of the compressor. A pipe 32 connects the cylinder 29 to the control connection 22 of the drain device. Whenever the pressure in the reservoir is sufficient to cause switch 31 to open the operating circuit of the compressor, pressure medium is admitted from the reservoir through the cylinder 29 and pipe 32, to the cylinder chamber 11 in which the piston 23 works thereby causing said piston to shift into position to first open the valve 20, and then seat the valve 24. In the interval of time between the unseating of valve 20 and the seating of valve 24, the pressure in the reservoir expels any water of condensation which has collected in the reservoir. When the pressure in the reservoir falls sufficiently for the end of pipe 32 which is connected to the cylinder 29 to be uncovered by the piston 30 in the movement of said piston to the left hand end of said cylinder as viewed in Fig. 4 the drain device cylinder 11 will be exhausted and the piston 23 will return to its initial position as shown in Fig. 2, thereby first unseating valve 24 and then seating valve 20, and again a jet of accumulated water of condensation, if any, will be expelled from the reservoir in the interval of time between the unseating of valve 24, and the seating of valve 20. In either case the jet will be forced out of the drain device through the ports 25.

From the foregoing description it will be seen that I provide an exceedingly simple structure of drain device which eliminates any accumulation of condensation water in the reservoir, which works automatically and requires no care or attention. The elimination of the accumulated water takes place as rapidly as it accumulates and hence the objections above noted attaching to present methods of eliminating the condensation water are entirely avoided.

It is to be understood that various changes in and modifications of the details may readily occur to persons skilled in the art without departure from the spirit and scope of my invention. I do not desire, therefore, to be limited or restricted to the exact details shown and described.

But having now set forth the objects and nature of my invention, and a structure embodying the principles thereof, what I claim as new and useful, and of my own invention, and desire to secure by Letters Patent is:

1. A drain valve structure comprising a plug and a casing member fitting into the same, said plug and casing member having interior chambers, inlet openings, and outlet ports, a valve arranged in each of said chambers, said valves seating in opposite directions and spaced apart from each other, the one arranged to be shifted by the other, and means to automatically shift the one of said valves.

2. A drain valve structure comprising a plug and a casing member fitting into the same, said plug and casing member having interior chambers, inlet openings, and outlet ports, oppositely seating valves respectively disposed in said chambers, and arranged in spaced apart relation to be shifted the one by the other to permit an interval of time between the unseating of one and the seating of the other, and means to automatically shift one of said valves.

3. A drain valve structure comprising a body having internal chambers, oppositely facing valve seats intermediate said chambers, valves respectively disposed in said chambers and cooperating with said seats, the seating of one valve operating to unseat the other, one of said valves being spaced apart from its seat to permit an interval of time when both valves are unseated, and means to automatically operate one of said valves.

4. A drain valve structure comprising a body having internal chambers adapted, respectively, to communicate with a reservoir and a source of control pressure, said body having an outlet port, oppositely facing valve seats intermediate said chambers, valves disposed, respectively, in said chambers and cooperating with said valve seats, and means to operate said valves to respectively seat and unseat, said means operating to permit an interval of time between the seating of one valve and the unseating of the other during which both valves are unseated.

5. A drain valve structure comprising a body having internal chambers adapted, respectively, to communicate with a reservoir and a source of control pressure, said body having an outlet port, oppositely facing valve seats intermediate said chambers, valves disposed, respectively, in said chambers and cooperating with said valve seats, and means arranged in one of said chambers, to be operated by the control pressure supply for seating one of said valves, the seating of said valve operating to unseat the other valve after the lapse of an interval of time during which both valves are unseated.

6. A drain valve structure comprising a body having internal chambers adapted, respectively, to communicate with a reservoir and a source of control pressure, said body having an outlet port, oppositely facing valve seats intermediate said chambers, valves disposed, respectively, in said chambers and cooperating with said valve seats, and a piston arranged in one of said chambers to be operated by the control pressure supply, for seating one of said valves, the seating of said valve operating to unseat the other valve after the lapse of an interval of time during which both valves are unseated.

7. A drain valve body having chambers at opposite ends, each chamber having an opening thereinto said body having a port opening through the wall thereof, oppositely disposed valve seats interposed between said chamber, a normally seated valve arranged in one of said chambers and provided with a stem projecting through said valve seats, a piston operating in the other of said chambers and carrying a valve arranged in line with said stem to engage the same when said piston is operated, and unseat its associated valve before the piston operated valve is seated, and means to operate said piston.

8. A drain valve body having chambers at opposite ends, each chamber having an opening thereinto, said body having a port through the wall thereof, oppositely disposed valve seats arranged in one of said chambers, and carrying a valve, a stem interposed between said valves, said stem being in alignment with said valve, whereby said piston actuated valve engages the same when the piston is operated, to unseat the associated valve before the piston operated valve is seated, and means for operating said piston.

In testimony whereof I have hereunto set my hand on this 8th day of August A. D., 1923.

ALBERT GOTTSCHALK.